United States Patent [19]

Narayanan et al.

[11] Patent Number: 4,814,974
[45] Date of Patent: Mar. 21, 1989

[54] PROGRAMMABLE MEMORY-BASED ARBITRATION SYSTEM FOR IMPLEMENTING FIXED AND FLEXIBLE PRIORITY ARRANGEMENTS

[75] Inventors: C. Murali Narayanan, Wheaton; Benjamin Zee, Oak Park, both of Ill.

[73] Assignee: American Telephone and Telegraph Company, AT&T Bell Laboratories, Murray Hill, N.J.

[21] Appl. No.: 845,489

[22] Filed: Mar. 28, 1986

Related U.S. Application Data

[60] Continuation of Ser. No. 662,035, Oct. 18, 1984, abandoned, which is a division of Ser. No. 394,888, Jul. 2, 1982, abandoned.

[51] Int. Cl.[4] ............................................. G06F 13/18
[52] U.S. Cl. ................................ 364/200; 340/825.51; 370/85
[58] Field of Search ... 364/200 MS File, 900 MS File; 370/85, 96; 340/825.5, 825.51

[56] References Cited

U.S. PATENT DOCUMENTS

| 4,005,391 | 1/1977 | MacPherson | 364/200 |
| 4,271,467 | 6/1981 | Holtey | 364/200 |
| 4,449,183 | 5/1984 | Flahive et al. | 364/200 |
| 4,470,111 | 9/1984 | Jenkins et al. | 364/200 |

OTHER PUBLICATIONS

Christensen NT, "Programmable Priority Mechanism", IBM Technical Disclosure Bulletin, vol. 17, No. 7, pp. 2052-2053.
C. H. Grant et al, Subchannel Addressing, IBM Tech. Disclos. Bulletin, (vol. 13, No. 8, Jan. 1971), pp. 2288-2290.
C. H. Grant et al., "Priority Interrupt Queing", I.B.M. Technical Disclosure Bulletin, vol. 15, No. 10 (Mar. 1973), pp. 3046-3048.
W. A. Barker et al., "Line Scanner Providing Priority Control Signals", I.B.M. Tech. Disclos. Bull., vol. 13, No. 10 (Mar. 1971), pp. 3032-3033.

Primary Examiner—Felix D. Gruber
Attorney, Agent, or Firm—David Volejnicek

[57] ABSTRACT

A digital system has a resource, such as a communication bus, adapted for access by a plurality of devices, a plurality of devices adapted to access the resource, and an arbitrator for arbitrating access to the resource by the devices. The arbitrator includes a programmable memory comprising a plurality of addressable words and an address generator for cyclically sequentially addressing each of the memory words. Each word stores information defining a priority order of the devices for accessing the resource. In particular, each word is divided into a plurality of segments, and each segment corresponds with a priority level in the order of priority. Each segment holds information identifying the device currently having the corresponding priority level. The priority order is changeable by reprogramming the contents of the memory. The priority order so implemented may be any conceivable order, and in particular may include a constant decreasing priority, a round-robin priority, or a combination of the two. A selecting arrangement responsive to the requesting devices and to the contents of the currently addressed memory word selects the highest priority requesting device for access to the resource, and an access granting arrangement grants to the selected device access to the resource.

9 Claims, 5 Drawing Sheets

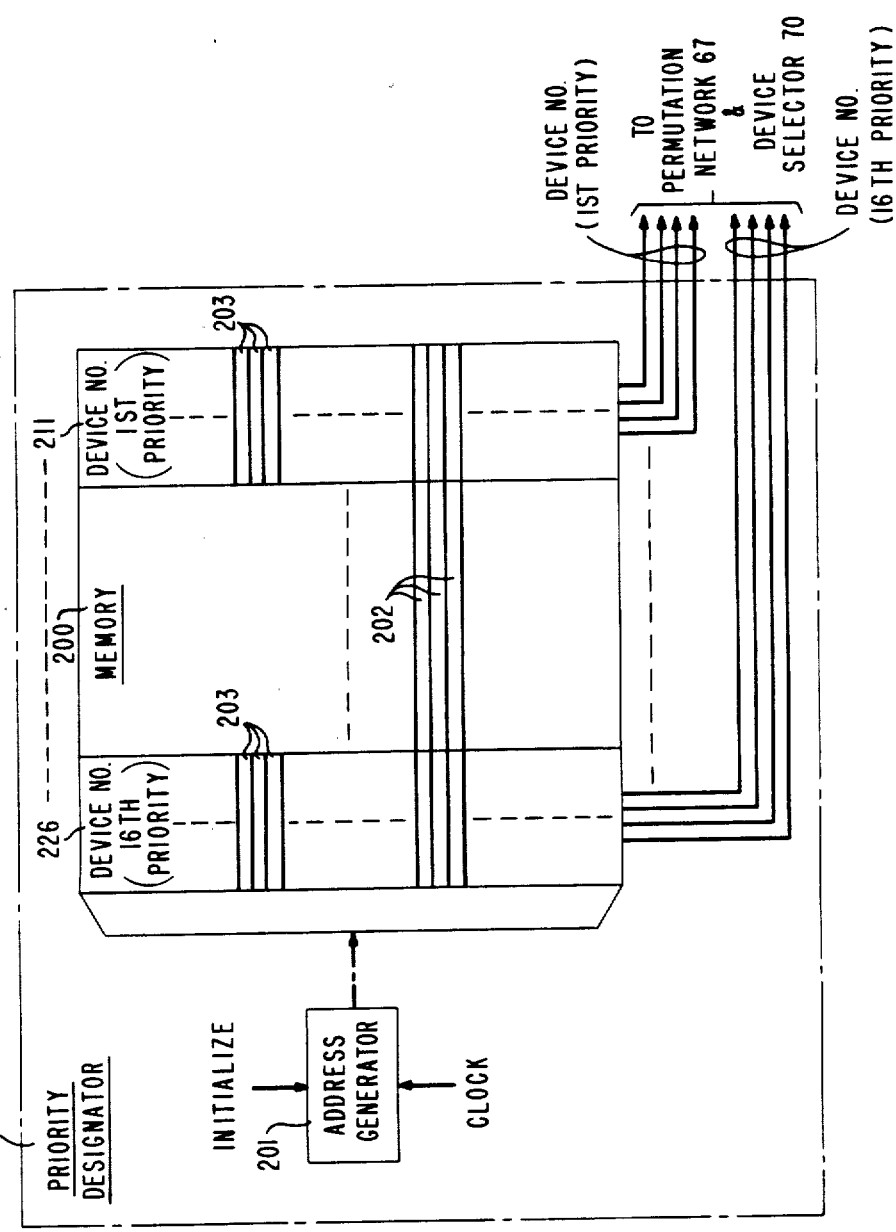

PROGRAMMABLE MEMORY-BASED ARBITRATION SYSTEM FOR IMPLEMENTING FIXED AND FLEXIBLE PRIORITY ARRANGEMENTS

CROSS-REFERENCE TO RELATED APPLICATIONS

This application is a continuation of application Ser. No. 662,035, filed Oct. 18, 1984, now abandoned, which was a division of the application of D. R. Sloan entitled "Programmable Priority Arbitration System", filed on July 2, 1982, Ser. No. 394,888, now abandoned assigned to the same assignee as this application.

TECHNICAL FIELD

This invention relates to the management of shared resources in digital control and processing systems, and in particular to schemes for controlling access to the shared resources in such systems.

BACKGROUND OF THE INVENTION

A digital control or processing system, such as a computer system, may include one or more parts, such as memory devices, communication buses, and input/output devices, which are utilizable by other devices of the system as resources for the execution of system tasks. For example, processors may utilize memory as a source of data and instructions and as a resource for storage of results; the processors may also utilize input/output devices as resources for communicating with the outside world, and may utilize buses as communication paths between themselves and the memory or the input/output devices. Memory devices may likewise utilize buses as resources for sending information to processors, while input/output devices may utilize the buses as resources for sending information to memory devices and to processors.

Simultaneous use by a plurality of system devices of the same resource is likely to produce errors. For example, a processor reading data from a memory module while an input/output device is sending data to the memory module may obtain incorrect data; the output of an input/output device may be garbled when two processors simultaneously supply it with output information; and communications passing along a bus may become scrambled and nonsensical when they collide with each other.

It is therefore necessary to provide means within the system to control concurrent access by devices to the shared resources, and to allow only one device at a time to access and make use of a resource.

The prior art has generally concerned itself with controlling access to communication paths such as buses, and has provided preassigned fixed time slot allocation, and request arbitration techniques for this purpose.

Of these bus access control techniques, request arbitration has generally been the most efficient. Arbitration schemes require devices wishing to access a bus to request bus use from an arbitration mechanism, which mechanism then selects one from a set of simultaneous requests and grants bus use for a period or slot of time to the selected device. Bus arbitration schemes achieve bus use efficiency by granting time slots only to devices currently wishing to utilize the bus, unlike preassigned fixed time slot allocation schemes which grant time slots to devices irrespective of whether the devices have a need to utilize the bus at that time. Latency, or waiting time of units wishing to access the bus, is thus decreased in the arbitration schemes, and is further improved because using units wishing to use the bus can substantially immediately appraise the arbitration mechanism of this fact, without having to wait for a query from the arbitration mechanism. In contrast, a unit wishing to use the bus in a bus allocation system must wait until its predetermined allocated time slot arrives.

Conventional bus arbitration schemes generally implement a fixed, unchanging priority scheme among the using devices. Non programmable hardware logic generates bus use grant signals as a function of the incoming request signals and a fixed and unchanging priority structure. Such schemes are inflexible because the priority structure is built into the logic hardware and there is no way, short of redesigning the arbitration circuit, to accommodate different applications or changing system configurations and request loads.

The prior art has sought to alleviate these limitations by providing programmable arbitration mechanisms in which the relative priority ordering of the using devices is indicated by the contents of storage devices, such as registers, and hence may be changed by reprogramming the register contents.

While providing programmability at one level, these mechanisms have not met the needs of multiprocessor computer systems and other bus-oriented digital systems that require flexible, programmable, class-oriented priority schemes. In such systems, using devices are commonly divided into classes, with each class having a different priority, while devices within a class have the same priority and are generally scheduled to access the bus in a round-robin, equal opportunity, manner. The prior art programmable arbitration mechanisms have traditionally not possessed the flexibility necessary to adapt to such a variety and combination of priority determining manners. Hence the prior art mechanisms have not been capable of meeting the changing needs of a variety of arbitrator applications, configurations of using devices, and device response time requirements.

SUMMARY OF THE INVENTION

This invention is directed to solving these and other disadvantages of the prior art. According to the invention, apparatus for controlling access by devices to a resource comprises a programmable memory having addressable locations, each of which comprises a plurality of storage segments wherein each storage segment of a location permanently corresponds with a unique priority level different from priority levels of the other storage segments at the location and stores information identifying the device having the corresponding priority level in defining an order of priority defined by that location. The apparatus further comprises an addressing arrangement coupled to the memory for cyclically addressing each addressable location. The access controlling apparatus also includes an arrangement coupled to the memory for selecting a device—preferably a device assigned a highest priority level—for access to the resource, based on information stored in the addressed location. Preferably, the selecting arrangement selects only a device requesting to access the resource.

Advantageously, each storage segment stores information identifying the device currently having the corresponding level of priority. "Currently" herein indicates that the device designated for a given priority may change, advantageously up to as often as each time that the access to the shared resource is arbitrated.

Being reprogrammable, the memory is adapted to change the priority order of the devices. And since different locations may have different contents, the access controlling apparatus is adapted to redetermine the priority order of the devices, by changing the level of priority assigned to devices, in any desired manner. The manner for changing the priority order advantageously includes constant decreasing priority, round-robin priority, or a combination of a plurality of manners. Constant decreasing priority herein refers to a fixed, static, priority ordering of the devices or classes of devices, which ordering changes only upon being reprogrammed. Unlike a round-robin priority ordering, for example, the constant decreasing priority is not changed when redetermined between reprogramming. While redetermining may occur as often as each time the shared resource is arbitrated, reprogramming generally occurs less frequently, for example at system initialization or reconfiguration, or at times of load shifts.

The above-described invention is well-suited for use in arbitration schemes, and thus it secures the advantages of high efficiency in time slot allocation and of low access latency for devices. By being reprogrammable in terms of both the order of priority among the devices and the manner of redetermining the priority order, the invention achieves flexibility which enables it to accommodate different applications, changing system configurations, changing request loads, and varying device response time requirements. The invention meets the requirements of class-oriented priority systems, as it is adapted to implement a manner of redetermining the priority order which manner is a combination of a plurality of manners, for example a constant decreasing priority manner among the classes and a round-robin manner among devices within a class.

These and other advantages of the present invention will become more apparent during the following description of an illustrative embodiment of the invention considered together with the drawing.

BRIEF DESCRIPTION OF THE DRAWING

FIG. 5 is a block diagram of the priority designator of FIG. 2 showing an embodiment of the priority generators of FIG. 2.

DESCRIPTION OF THE PREFERRED EMBODIMENT

Figure 1:
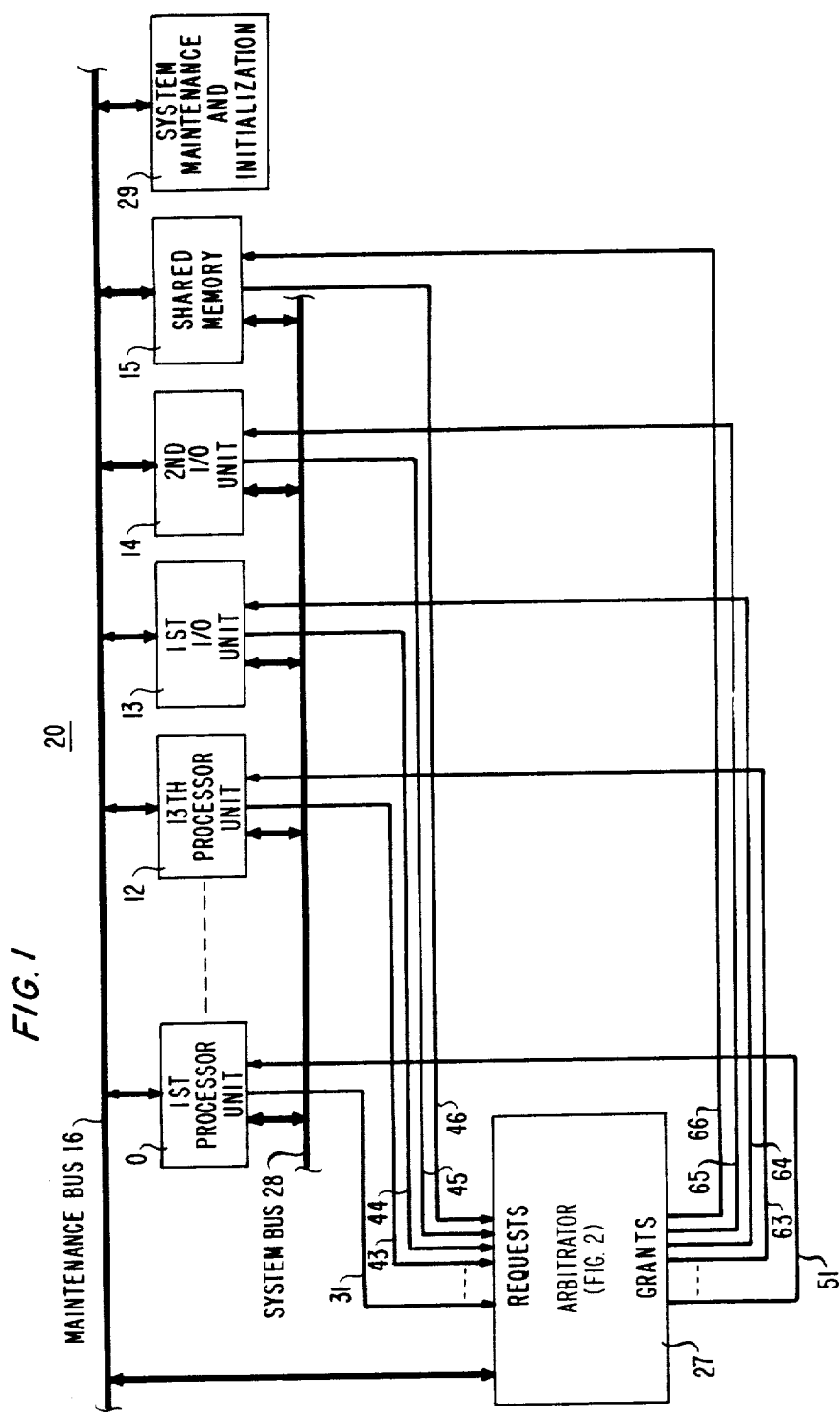
FIG. 1 is a block diagram of a system embodying an illustrative example of the invention.

While the present invention may be utilized in any suitable digital system for controlling access by any suitable number of devices to any suitable resource, for purposes of illustrating the invention FIG. 1 shows a particular system 20 embodying the invention.

SYSTEM

The system 20 is a multiprocessor computer system in which a plurality of devices 0–15, such as processor units 0–12, I/O units 13–14, and a shared memory unit 15, communicate with each other across a system bus 28 which serves as a shared communication medium for the system 20. The system 20 further includes a system maintenance and initialization block 29 which is connected to the devices 0–15 by a maintenance bus 16. The block 29 performs conventional initialization and maintenance functions in the system 20.

In order to preserve the integrity of communications within the system 20, an arbitrator 27 is associated with the bus 28 and allows only a single device 0–15 to transmit on the bus 28 at any one time. The arbitrator 27 is connected to the maintenance bus 16 for initialization.

Each of the devices 0–15 has a REQUEST line 31–46, respectively, and a GRANT line 51–66, respectively, connecting it to the arbitrator 27. The lines 31–46 and 51–66 provide signaling paths between the arbitrator 27 and the devices 0–15.

When a device 0–15 wishes to access the system bus 28 for purposes of sending a communication thereon, it asserts its associated REQUEST line 31–46 to request access to the bus 28 from the arbitrator 27. The arbitrator 27 receives the request from that, and any other, device 0–15 wishing to use the bus 28. When a plurality of devices 0–15 request use of the bus 28 substantially simultaneously, i.e., within the same predetermined period of time, or while the bus 28 is in use, the arbitrator 27 selects one of the requests according to some order of priority and signals the selected device 0–15 over the associated GRANT line 51–66 that it has been granted access to the bus 28.

Alternatively, the GRANT lines 51–66 may be replaced by a common GRANT bus (not shown) that is connected to all of the devices 0–15. In such a configuration, the arbitrator 27 generates identification (ID), such as the device number, of the selected device 0–15 and broadcasts it along the GRANT bus to all of the devices 0–15. Each device 0–15 has an ID decoder (not shown) associated therewith and adapted to recognize the ID of its associated device 0–15. The ID decoder of the selected device 0–15 recognizes the broadcast ID and signals the device 0–15 that it has been awarded the grant of access to the system bus 28.

ARBITRATOR

Figure 2:
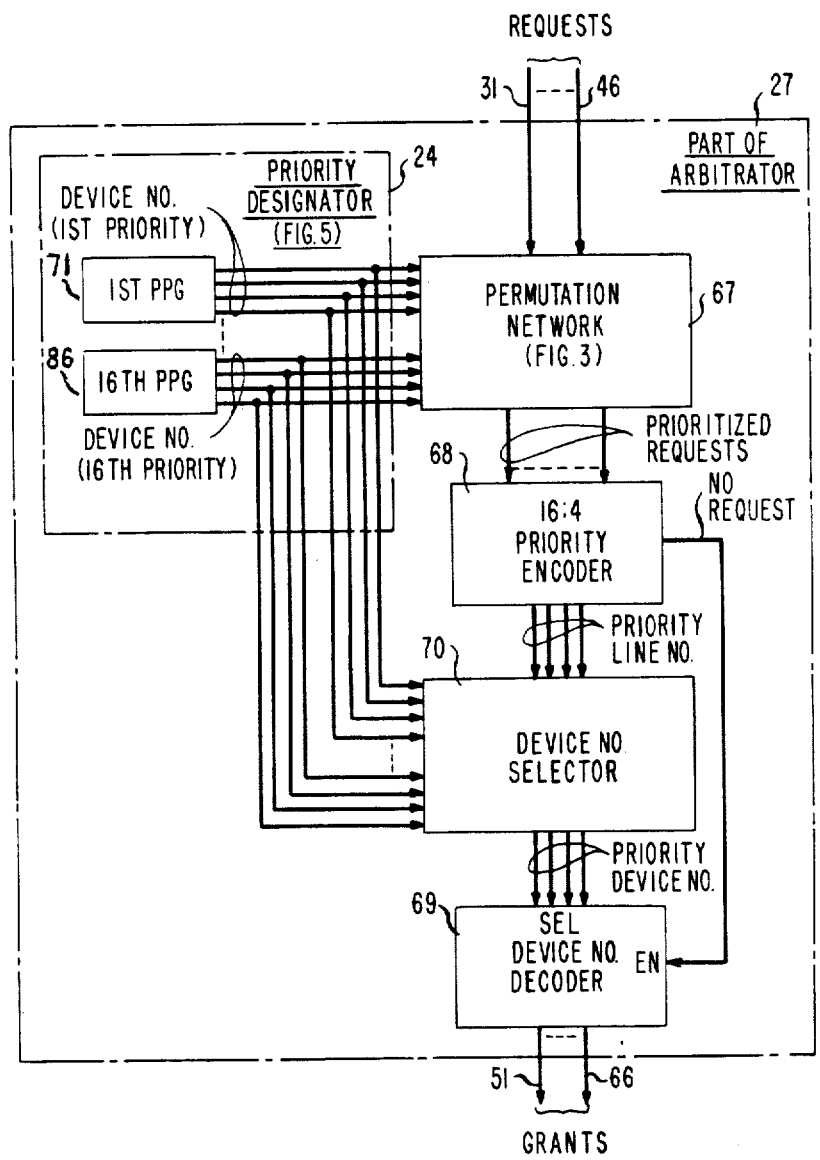
FIG. 2 diagrams in block form that portion of the arbitrator of FIG. 1 which is involved in arbitrating access by devices to the system bus of FIG. 1.

Turning now to FIG. 2, there is shown diagramed the portion of the arbitrator 27 which is involved in selecting a device 0–15 for access to the bus 28.

As the system 20 includes 16 devices 0–15, the arbitrator 27 must distinguish 16 levels of priority to uniquely designate the priority level of each device 0–15. For this purpose, the arbitrator 27 includes a priority designator 24 whose outputs designate the current order of priority of the devices 0–15. The priority designator 24 of this illustrative embodiment comprises 16 programmable priority generators 71–86, each of which is associated with one priority level. The first generator 71 is associated with the highest priority level, the second generator 72 is associated with the second highest priority level, and so on, down to the generator 86 which is associated with the lowest priority level. Each generator 71–86 generates the identification, such as the device number, of the unique device 0–15 currently having that level of priority. The generators 71–86 are preferably all the same, and for illustrative purposes the generator 71 is discussed in further detail in conjunction with FIG. 5. Each generator 71–86 outputs the device number in binary form onto four DEVICE NO. leads which connect the generator 71–86 to control ports of a permutation network 67 and a device number selector 70. Thus the network 67 and the selector 70 each have 64 control inputs from the priority designator 24.

The REQUEST lines 31-46 from the devices 0-15, respectively, are connected to an input port of the permutation network 67. The permutation network 67 is a conventional logic network whose outputs are simply its inputs, possibly rearranged according to some predetermined order. The network 67 reorders the REQUEST lines 31-46 in the order of the priority of their associated devices 0-15, as specified by the inputs from the priority generators 71-86. The permutation network 67 is diagramed in FIG. 3.

As that figure shows, the network 67 is comprised of a set of 16 sixteen-to-one multiplexers 91-106 The 16 REQUEST lines 31-46 are connected to the input port of each multiplexer 91-106. The select (SEL) input port of each multiplexer 91-106 is connected to the four DEVICE NO. leads from the associated priority generator 71-86, respectively. Based on the input from the associated priority generator 71-86, each multiplexer 91-106 selects a single REQUEST line 31-46 for connection to its output lead. Thus the multiplexer 91 connects the REQUEST line of the highest priority device 0-15 to its output, the multiplexer 92 connects the REQUEST line of the second highest priority device 0-15 to its output, and so on down to the multiplexer 105 which connects the request line of the second lowest priority device 0-15 to its output, and the multiplexer 106 which connects the REQUEST line of the lowest priority device 0-15 to its output. The output leads of the multiplexers 91-106 are arranged sequentially such that the request lines at the output of the network 67, referred to as the PRIORITIZED REQUEST lines, are arranged in the order of priority of their associated device 0-15, with the leftmost line representing the highest priority device 0-15.

Figure 3:
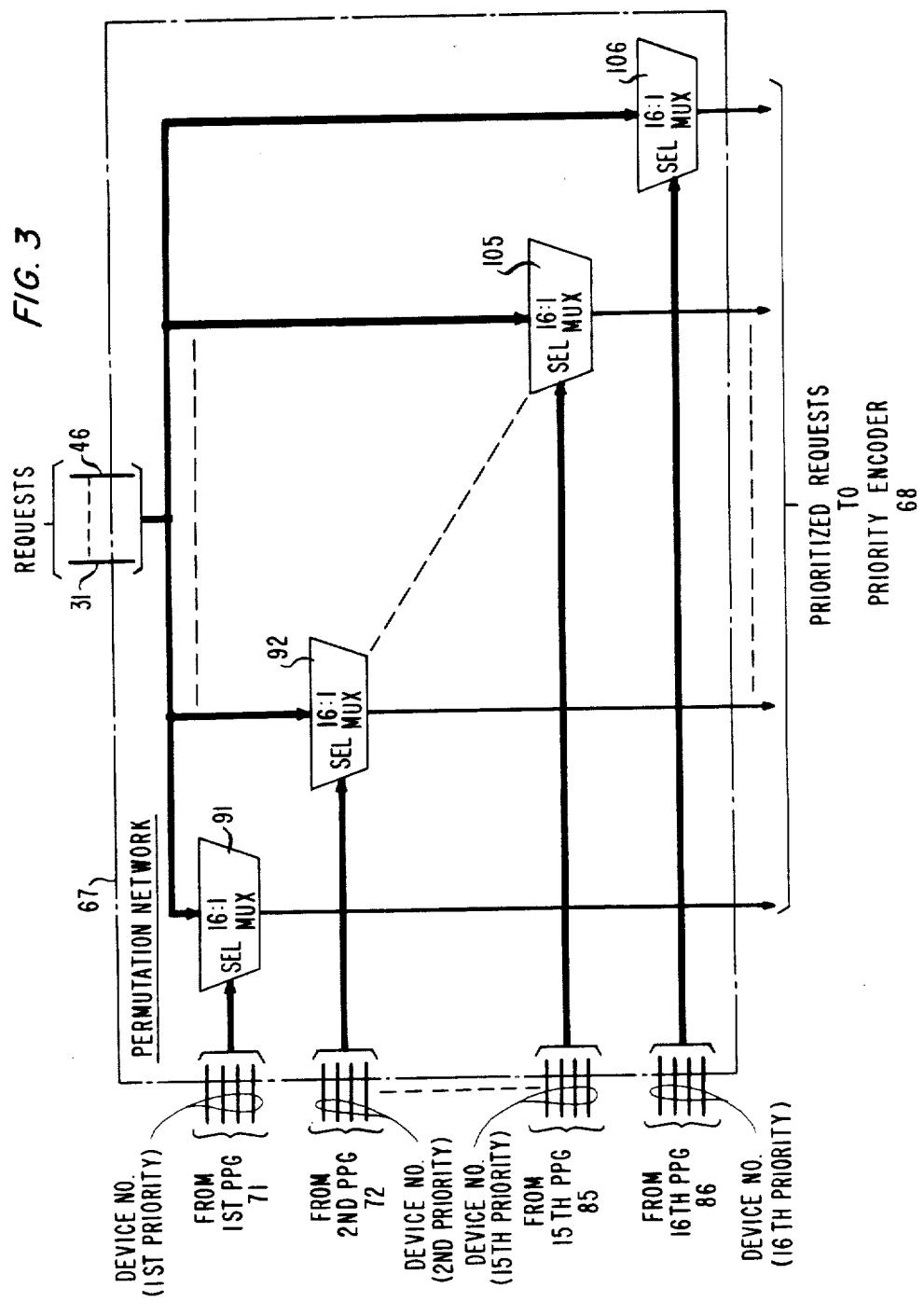
FIG. 3 is a block diagram of the permutation network of FIG. 2.

While FIG. 3 shows the permutation network 67 constructed from a single stage of multiplexers, it will be clear to those skilled in the art that other embodiments and configurations of devices to achieve the same functionality are possible.

Returning now to FIG. 2, the PRIORITIZED REQUEST lines at the outputs of the permutation network 67 are connected to an input port of a sixteen-to-four priority encoder 68. The encoder 68 is any suitable device or set of devices that finds the highest priority asserted REQUEST line from the PRIORITIZED REQUEST lines and encodes the number of that REQUEST line. Those skilled in the art can readily construct a sixteen-to-four priority encoder from commonly available eight-to-three or four-to-two priority encoder parts.

If devices 0-15 request access to the system bus 28 by asserting their REQUEST lines 31-46 low, (i.e., logic 0), and the PRIORITIZED REQUEST lines 31-46 are arranged at the output of the network 67 such that the leftmost REQUEST line is the highest priority REQUEST line, the priority encoder 68 is a conventional sixteen line "find leftmost zero" circuit. The number of the selected REQUEST line is a function of its position relative to the other REQUEST lines among the PRIORITIZED REQUEST lines. The leftmost position is REQUEST line number 0, while the rightmost position is REQUEST line number 15. In the above example, if the selected line were the one connecting to the output of the multiplexer 91 (see FIG. 3), the encoder 68 would identify it as the REQUEST line number 0, while if the selected line were the one connecting to the output of the multiplexer 106, the encoder 68 would identify it as the REQUEST line number 15.

The encoder 68 has four PRIORITY LINE NO. output leads across which it outputs the number of the selected line. The priority encoder 68 has an additional output lead referred to as NO REQUEST lead, which it asserts when none of the REQUEST lines are asserted and hence no access to the bus 28 is granted.

Figure 4:
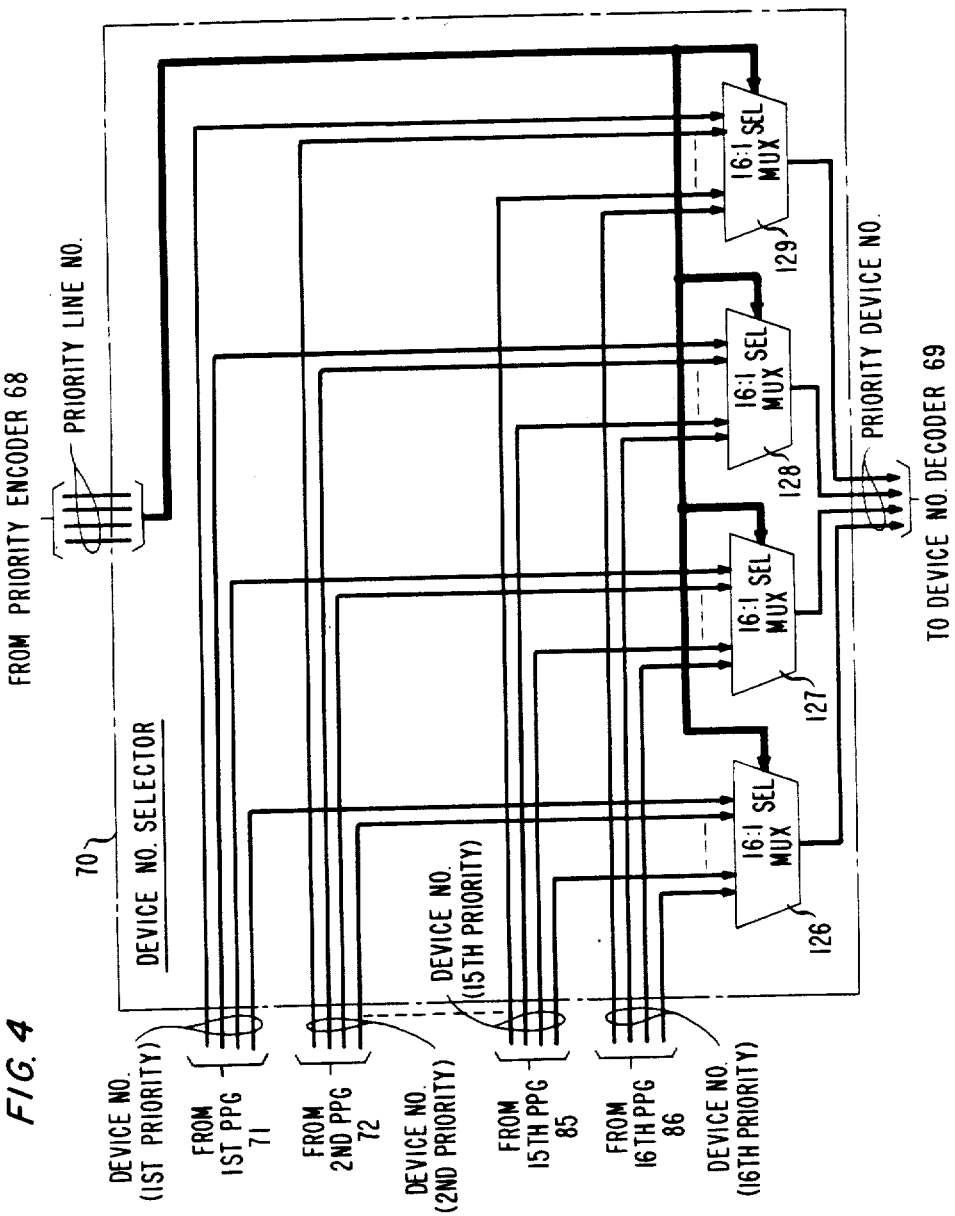
FIG. 4 is a block diagram of the device number selector of FIG. 2.

The four PRIORITY LINE NO. leads are connected to a control input port of the device number selector 70. Other inputs to the selector 70 comprise the 64 DEVICE NO. leads from the priority designator 24. The selector 70 uses the DEVICE NO. inputs to convert the number of the line selected by the encoder 68 into the number of the corresponding selected device. The selector 70 is diagramed in FIG. 4.

As is shown by that figure, the selector 70 comprises four 16:1 multiplexers 126-129. Each multiplexer 126-129 has its input port connected to one DEVICE NO. line from each of the priority generators 71-86 of the priority designator 24. The 16 DEVICE NO. lines connected to one multiplexer 126-129 are all of the same order. For example, the multiplexer 126 is connected to the DEVICE NO. lines which specify the most significant binary digit of the device numbers generated by the generators 71-86, while the multiplexer 129 is connected to the DEVICE NO. lines which specify the least significant binary digit of the device numbers generated by those generators 71-86.

The four PRIORITY LINE NO. leads from the encoder 68 are connected to the select (SEL) input port of each of the multiplexers 126-129. As a function of the select inputs, each of the multiplexers 126-129 selects one of its 16 inputs from the generators 71-86 for connection to its output. The selected input is the input from the generator 71-86 whose priority level corresponds to the line number generated by the encoder 68. Thus, for example, if the PRIORITY LINE NO. leads specify the first line, the multiplexers 126-129 select the input leads from the first priority generator 71; if the second line is specified, the input leads from the second priority generator 72 are selected; and so on. The priority line number is thus converted by the selector 70 into the device number of the device selected for access to the bus 28. The device number of the selected device is output by the selector 70 onto four PRIORITY DEVICE NO. leads.

As shown in FIG. 2, the PRIORITY DEVICE NO. leads from the selector 70 are connected to a select (SEL) input port of a device decoder 69, while the NO REQUEST lead from the encoder 68 is connected to an enable (EN) input of the decoder 69. Outputs of the decoder 69 are connected to the 16 GRANT lines 51-66. The decoder 69 responds to the priority device number input from the selector 70 by asserting the GRANT line of that device 0-15 to signal that device 0-15 that it has been granted access to the system bus 28. When no requests are present and the priority encoder 68 asserts the NO REQUEST lead, the decoder 69 is disabled from asserting any of the GRANT lines 51-66, and consequently none of the devices 0-15 become enabled to use the bus 28.

In the above-described alternative wherein GRANT lines dedicated to individual devices 0-15 are replaced by a GRANT bus connected to all of the devices 0-15, the decoder 69 is not used and the GRANT bus (not shown) is connected to the PRIORITY DEVICE NO.

output leads of the selector 70 and to the NO REQUEST lead of the encoder 68. The decoding function of selecting the device whose number is output on the GRANT bus is then performed by the comparators (not shown) one of which is located at each device 0-15. Each comparator compares the GRANT bus contents with the device number of the associated device 0-15. When a comparator detects a match and when the NO REQUEST line is not asserted, the comparator outputs a signal to the associated device 0-15 to advise it that it has been granted access to the bus 28.

PROGRAMMABLE PRIORITY GENERATORS

Returning now to a consideration of the programmable priority generators 71-86 of the priority designator 24, they are substantial duplicates of each other, and hence only one, the generator 71, need be considered in detail, it being understood that the discussion applies to the others as well.

The priority generator 71 may be comprised of a memory unit, in which the contents of each memory word specify a device number, and an address generator which selects one of the memory words at any one time and causes its contents to be output onto the DEVICE NO. leads. In such an embodiment of the generator 71, all the generators 71-86 are preferably combined into a single unit priority designator 24 to avoid unnecessary duplication of circuitry.

Such an embodiment of the priority designator 24 is shown in FIG. 5. The priority designator 24 is comprised of a programmable memory 200, such as a random access memory (RAM), and an address generator 201. The memory 200 is comprised of a plurality of words 202, each of which is 64 bits wide. The memory 200 is divided into 16 columns 211-226 each 4 bits wide. The bits of the 64 bit memory word may be distributed among several memory modules, depending on the width of the memory package used. Memory packages are typically 1 bit, 4 bit, 8 bits, or 9 bits wide. Each column 211-226 contains a 4 bits long segment 203 of each of the words 202. Each column 211-226 represents a single priority generator 71-86, respectively, and contains the data, the device numbers, that must be generated by the generator 71-86. Each word 202 contains the data, the device numbers, to specify a single particular priority ordering of the sixteen devices 0-15.

Thus, the column 211 specifies all of the devices 0-15 that will at any time have first priority, the column 212 specifies all of the devices 0-15 that will at any time have second priority, and so on down to the column 226, which specifies all of the devices 0-15 that will at any time have sixteenth priority. A segment 203 of the column 211 specifies a single device 0-15 that will have first priority at some period in time, while another segment 203 of the column 211 specifies a single device 0-15 that will have first priority at some other period in time. And a word 202 of the memory 200 specifies a particular order of priority of the devices 0-15, from first priority to last priority, that will exist at some period in time, while another word 202 specifies a particular priority order that will exist at some other period in time.

To change the order of priority of the devices 0-15 and/or the manner of determining their priority, the contents of the words 202 of the memory 200 are changed by reprogramming the memory 200.

The words 202 have addresses associated with them, and the address generator 201 generates these addresses, one at a time. The address generator 201 has as inputs the INITIALIZE line from the system maintenance and initialization block 29, and the system CLOCK input. Upon initialization, in response to the INITIALIZE signal and the receipt of a CLOCK pulse, the address generator 201 generates a predetermined address of a word 202 of the memory 200, and thereafter upon the receipt of each CLOCK pulse, it generates a new address according to some predetermined scheme.

Address generators are well known to the art, and the address generator 201 may be any suitable unit. For example, the generator 201 may be a simple binary counter which upon initialization begins to count at 0 and for each received CLOCK pulse increments its output, up to the number of words 202 contained in the memory 200. Having counted to that number, the counter resets its count to 0 upon the receipt of the next CLOCK pulse and begins to cycle through the count again, performing the counting loop over and over again. Alternatively, the generator 201 may be a dynamically traffic-driven device, which monitors the contents of the word 202 that it is currently addressing (not shown) and generates a subsequent address as a function of these contents.

The memory 200 is connected to the DEVICE NO. lines; in particular, the column 211 is connected to the first priority DEVICE NO. lines, the column 212 is connected to the second priority DEVICE NO. lines, and so on down to the column 226, which is connected to the 16th priority DEVICE NO. lines.

Each address generated by the address generator 201 forms an input to the memory 200 where it selects a word 202 for connection to the DEVICE NO. lines. The contents of the word 202, which is currently being addressed, are transferred onto the DEVICE NO. lines and are conducted thereby to the permutation network 67 and to the device number selector 70 (see FIG. 2), to designate the current order of priority of the devices 0-15.

The art is well acquainted with the programming and reprogramming of conventional memories; hence no discussion thereof is needed here.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

What is claimed is:

1. A digital system comprising:
   (A) a resource;
   (B) a plurality of devices coupled to the resource for accessing the resource; and
   (C) means coupled to the devices for controlling access by the devices to the resources, the controlling means including
   a programmable memory means comprising addressable locations, each of said addressable locations comprising a plurality of storage means, each storage means of an addressable location permanently corresponding with a unique priority level different from priority levels of the other storage means at that same location, and each storage means of each addressable location for storing information identifying the device having the corresponding level of priority;

addressing means coupled to the memory means for cyclically addressing each addressable location to retrieve from the addressed location the information stored by the storage means thereof; and means coupled to the memory means and to the plurality of devices and responsive to the information stored in the plurality of storage means of an addressed location for selecting a device for access to the resource.

2. The system of claim 1 wherein the access controlling means further comprise means coupled to the plurality of devices for determining which devices request to access the resource, and wherein the selecting means are coupled to the means for determining for selecting for access to the resource a device requesting to access the resource.

3. The system of claim 1 wherein each of the plurality of devices have means for providing signals requesting device access to the resource, and wherein the selecting means are coupled to the means for providing signals to receive the requesting signals, for selecting a requesting device for access to the resource.

4. The system of claim 1 wherein
the selecting means are coupled to the memory means to receive from the plurality of means of the one currently addressed location the stored information, for selecting for access to the resource a device having a highest priority level in the order of priority.

5. The system of claim 1 wherein each storage means is reprogrammable to change the device identified thereby.

6. A digital system comprising:
(A) a resource;
(B) a plurality of devices coupled to the resource for accessing the resource; and
(C) means coupled to the devices for controlling access by the devices to the resource, the controlling means including
a programmable memory means comprising addressable locations, each of said addressable locations comprising a plurality of storage means, each storage means of an addressable location permanently corresponding with a unique priority level different from priority levels of the other storage means at that same location, and each storage means of each addressable location for storing information identifying the device having the corresponding level of priority;
addressing means coupled to the memory means for cyclically addressing each addressable location;
means coupled to the memory means and to the plurality of devices and responsive to the information stored in the plurality of storage means of an addressed location for selecting a device for access to the resource; and
means for providing clocking signals to the addressing means, wherein the addressing means respond to each clocking signal by addressing a location other than the location which the addressing means are currently addressing.

7. An arbitrator for arbitrating access by devices to a resource in a digital system which includes a resource shared by a plurality of devices, a plurality of devices coupled to the resource for generating signals to request access to the resource, and means coupled to the devices for granting to a device selected by the arbitrator access to the resource, the arbitrator comprising:
a programmable memory means comprising addressable locations, each of said addressable locations comprising a plurality of storage means, each storage means of an addressable location permanently corresponding with a unique priority level different from priority levels of the other storage means at that same location, and each storage means of each addressable location for storing information identifying the device having the corresponding priority level in an order of priority defined by that addressable location;
addressing means coupled to the memory means for cyclically addressing each addressable location to retrieve from the addressed location the information stored by the storage means thereof;
means for receiving request signals generated by the devices; and
means, coupled to the memory means and to the means for receiving and responsive to the request signals and to the information stored in the plurality of storage means of an addressed location for selecting for access to the resource a requesting device having a highest priority level in the order of priority defined by that addressed location.

8. The arbitrator of claim 7 wherein each storage means is reprogrammable to change the device identified thereby.

9. An arbitrator for arbitrating access by devices to a resources in a digital system which includes a resources shared by a plurality of devices, a plurality of devices coupled to the resource for generating signals to request access to the resource, and means coupled to the devices for granting to a device selected by the arbitrator access to the resource, the arbitrator comprising:
a programmable memory means comprising addressable locations, each of said addressable locations comprising a plurality of storage means, each storage means of an addressable location permanently corresponding with a unique priority level different from priority levels of the other storage means at that same location, and each storage means of each addressable location for storing information identifying the device having the corresponding priority level in an order of priority defined by that addressable location;
addressing means coupled to the memory means for cyclically addressing each addressable location;
means for receiving request signals generated by the devices; and
means, coupled to the memory means and to the means for receiving and responsive to the request signals and to the information stored in the plurality of storage means of an addressed location, for selecting for access to the resource a requesting device having a highest priority level in the order of priority defined by that addressed location; and
means for providing clocking signals to the addressing means, wherein the addressing means respond to each clocking signal by addressing a location other than the location which the addressing means are currently addressing.

* * * * *

UNITED STATES PATENT AND TRADEMARK OFFICE
CERTIFICATE OF CORRECTION

PATENT NO. : 4,814,974

DATED : March 21, 1989

INVENTOR(S) : C. M. Narayanan and B. Zee

It is certified that error appears in the above-identified patent and that said Letters Patent is hereby corrected as shown below:

Column 9, line 25, before "means", insert --storage--.

Signed and Sealed this

Twenty-eighth Day of July, 1992

Attest:

DOUGLAS B. COMER

Attesting Officer

Acting Commissioner of Patents and Trademarks